Patented Oct. 29, 1935

2,018,955

UNITED STATES PATENT OFFICE 2,018,955

PROCESS OF MAKING CALCIUM SULPHATE

Winfield W. Heckert, Ardentown, and Gordon D. Patterson, Wilmington, Del., assignors to Krebs Pigment & Color Corporation, Newark, N. J., a corporation of Delaware No Drawing. Application March 27, 1935, Serial No. 13,222

16 Claims. (Cl. 23—122)

The present invention relates to processes in which calcium sulphate is precipitated from an aqueous medium and is particularly characterized by the presence in such medium of an agent, called restraining agent, which inhibits or retards the crystal growth of the precipitated calcium sulphate.

Such restraining agents can be used in various processes of precipitating calcium sulphate from an aqueous medium, such as for instance in the action of a calcium compound upon a sulphate radical containing compound such as sulphuric acid or a soluble sulphate, for instance, calcium chloride and sodium sulphate, or calcium nitrate and ammonium sulphate, or calcium acetate and potassium sulphate or magnesium sulphate, or calcium hydrosulphid and zinc sulphate, in general in any metathetical reaction of this type. Our invention is similarly applicable in reactions where sulphuric acid is allowed to act upon a calcium compound such as calcium carbonate, lime, CaO, hydrated lime, or a decomposable calcium salt such as calcium chloride, etc. From a practical standpoint the use of our novel restraining agents is particularly useful in the reactions between sulphuric acid and lime, CaO; calcium hydroxide, Ca(OH)$_2$; and calcium carbonate, CaCO$_3$.

The manner in which the calcium sulphate has been formed seems to be of no influence upon the action of the restraining agent, which seems to function entirely during the contact of the originally formed calcium sulphate particles with the aqueous medium from which the sulphate was precipitated. The action is noticeable in alkaline, neutral or acid media, though it is most pronounced in the latter which in the absence of such restraining agents favor crystal growth.

Our novel restraining agents function as crystal growth inhibitors for the various calcium sulphate modifications such as gypsum (the dihydrate) and plaster of Paris (the hemi-hydrate) which can be obtained by precipitation from aqueous media, and is particularly pronounced for such of the calcium sulphate modifications which are precipitated in an acicular crystal form.

The restraining agents of our invention are compounds which in aqueous solution form positive ions which have an ionic radius of at least 1.0 but less than 1.2 Angstrom units and which have a valency greater than 2.

The data relative to ionic radii can, for instance, be found in the 2nd Edition of Wyckoff's "The Structure of Crystals", pages 192 and 193, or V. M. Goldschmidt's "Geochemische Verteilungsgesetze der Elemente" publ. Oslo 1926, Vol. VII page 32, who gives a series of ionic radii of rare earth elements.

The fact that the ionic radii of the positive ions effective in retarding crystal growth are of the same order of magnitude as that of the calcium ion (1.05A) may afford an explanation for their effectiveness in that their incorporation into the crystal lattice may in some manner result in a deformation or distortion of the crystal thus limiting the rate of growth. Furthermore, the effective ions are also of high valency which may also be a contributing factor in influencing their adsorption on certain faces of the growing crystal or actual incorporation in the crystal lattice.

This explanation of the mechanism of the action of our novel restraining agent is given as a theory only and should in no way be considered as limiting our invention. It is supported on the one hand by the fact that every compound containing a positive ion of an ionic radius of at least 1.0 but less than 1.20 and a valency greater than 2 which has been tested by us shows an inhibiting or restraining effect on the crystal growth of calcium sulphate whereas no compound outside this range was found to be effective and on the other hand it was found that in some instances traces of the restraining agent had been adsorbed or otherwise associated with the calcium sulphate precipitated in the presence of such an agent.

This is particularly noticeable with cerium salts, which are detectable in calcium sulphate precipitated in the presence of such a salt. Small amounts of cerium salts do not noticeably affect the color of the calcium sulphate precipitated. When large amounts of cerium salts, particularly tetravalent cerium salts, are adsorbed on the calcium sulphate, the resulting product is slightly colored, the colors ranging from cream to sienna, and such colored calcium sulphate can be used to advantage as extenders for other colored pigments.

Similarly thorium compounds tend to be associated with the calcium sulphate precipitate.

Compounds, which due to their commercial availability and effectiveness are particularly useful in our invention are compounds of tetravalent thorium, cerium and uranium. A somewhat lesser efficiency are compounds of trivalent cerium and thallium or of other rare earth metals.

The ionic radii of such elements are given below:

*Ions within the above limits*

| Ion | Ionic Radius in Å units |
|---|---|
| Th⁴ | 1.10 |
| Ce⁴ | 1.01 |
| U⁴ | 1.05 |
| Pr⁴ | 1.00 |
| Ce³ | 1.10 |
| La³ | 1.15 |
| Pr³ | 1.08 |
| Nd³ | 1.08 |
| Tl³ | 1.05 |

In the following table we list the ionic radii of a number of other elements in various valency stages. These are all outside the limits which we found make the ions available in our invention. These have been tested by us and it was in each instance found that these ions had no influence upon the growth of calcium sulphate crystals.

*Ineffective ions*

| Ion | Radius in Å units |
|---|---|
| Sn⁴ | 0.65 |
| Zr⁴ | 0.80 |
| Bi³ | 1.20 |
| Al³ | 0.55 |
| Cr³ | 0.70 |
| Cd² | 0.99 |
| Co² | 0.78 |
| Pb² | 1.18 |
| Mg² | 0.75 |
| Mn² | 0.83 |
| Ni² | 0.74 |

Our novel restraining agents are effective in amounts of from about 0.1 mol per cent of the element based on the calcium sulphate present, up to the solubility of their sulphates in the reaction mixture. From 0.2 to about 2 mol per cent of the effective element is the amount preferred for commercial operations, though higher amounts can be used without noticeable disadvantage.

The effect of the agent is not manifest in exactly the same way in every case and for different types of preparation. It was, for instance, found that in the use of a sulphuric acid solution containing small amounts of thorium an apparent change of crystal shape as well as size was noted. The smaller amounts of the agent caused the formation of needle-like crystals which appeared identical in shape with those formed with pure acid but which were smaller. By increasing the amount of thorium not only needle-like crystals were formed, but in addition some broad, plate-like crystals began to appear. The amount of thorium which can be added to the sulphuric acid is, however, limited due to the relatively low solubility of thorium sulphate.

The effect of increasing the amount of ceric salt added was similar to that observed for the thorium salt.

The addition of cerous salts, although apparently less effective than ceric salts, produced needle-like crystals, many of which were similar to those formed from pure acid but which were much thinner and less massive and consequently could be much more easily broken down by grinding.

It is well known that precipitating conditions, such as temperature, and acidity, neutrality, or alkalinity of the reaction medium have a marked influence upon the size of the calcium sulphate particles produced. However, in all cases the addition of our restraining agents decreases the particle size of the resulting calcium sulphate.

It is in general the experience that calcium sulphate of smaller crystal size is produced in a neutral medium such as in the reaction between a calcium salt and a sulphate such as calcium chloride and sodium sulphate, than in an acid medium. In cases where conditions are such that a product of relatively small crystal size is produced the effect of the restraining agent, although very evident, is not as pronounced as in systems which foster rapid crystal growth of the product. In order to actually evaluate and determine the true effectiveness of a specific agent it is necessary to prepare a product following a specified procedure both in the presence and absence of the restraining agent.

We are describing in the following examples a few of the operations in which we used our novel restraining agents for the preparation of calcium sulphate precipitates of small crystal size.

*Example 1.*—A lime suspension was made by mixing 466 grams of hydrated lime to give a total volume of 3 liters. This suspension was pebble-mill ground to obtain thorough and uniform disintegration.

This suspension of calcium hydroxide was then added slowly with constant agitation to 16.32 lbs. of an aqueous sulphuric acid of 16.5% $SO_4$ containing 1.75 grams of raw rare earth metal compounds figured as oxides, of which 0.60 grams were $U_2O_5$, 0.30 grams $CeO_2$ and 0.10 grams $ThO_2$. Calcium sulphate precipitated. It was filtered and dried. It was of acicular form and the individual crystals were in the average noticeably smaller than the crystals obtained in the same manner from a sulphuric acid which did not contain rare earth metal compounds.

*Example 2.*—250 grams of a calcium hydroxide suspension corresponding to 50 grams CaO was added while stirring to an 8% sulphuric acid solution containing 2.2 grams cerous oxalate. Calcium sulphate in the form of very fine needles was obtained. The amount of cerous oxalate present corresponded to 0.69 mol per cent of Ce.

*Example 3.*—454 grams of an acid containing 19.0% $SO_4$ and in composition entirely similar to that of Example 1, was slowly added with constant stirring to 200 grams of a 50% solution of $CaCl_2$. A very fine acicular calcium sulphate was formed.

The amount of restraining agent present figured in the same manner as in Example 1 corresponded to 0.26 mol per cent.

*Example 4.*—0.75 grams thorium nitrate $Th(NO_3)_4$ was added to a solution of 92 grams 96% sulphuric acid in 362 grams water and this solution slowly added to 200 grams of a 50% calcium chloride solution. The precipitated calcium sulphate was washed and dried and appeared in the form of exceedingly fine needles, much smaller than those obtained under similar conditions in the absence of the thorium nitrate.

The amount of thorium present in this reaction was 1.72 mol per cent.

*Example 5.*—Use of thallium as the restraining agent. Thallous acetate was dissolved in a 19% sulphuric acid and hydrogen peroxide added to oxidize the thallium to the trivalent state. An equivalent amount of calcium chloride was then added. Amounts corresponding to 2.2 grams $Tl_2O_3$ per 1000 grams of the acid produced a calcium sulphate of distinctly smaller crystal size than the same reaction performed in the absence of the thallium ions, and with 4.4 grams the reduction of the size of the crystals was comparable to that obtained with cerium or thorium salts.

Similar results were obtained by mixing a sodium sulphate solution with a calcium chloride solution in the presence of corresponding amounts of a tri-valent thallium salt.

*Example 6.*—Use of uranium as the restraining agent: Uranium nitrate $UO_2(NO_3)_2$ was added to a 19% sulphuric acid and the uranium reduced to the tetravalent stage by the addition of metallic zinc to the acid solution.

Uranium was used in an amount corresponding to 4.75 grams $UO_2$ per 1000 grams of the 19% acid. This was run into a calcium chloride solution and a calcium sulphate of exceedingly fine crystal size obtained.

In a series of preparations in which calcium sulphate was prepared by mixing equivalent amounts of 19% sulphuric acid and 50% calcium chloride in the presence of various amounts of cerium salts the following results were obtained:

With 1.2 grams $CeO_2$ per 1000 grams of 19% sulphuric acid a pronounced reduction of the size of the needle-like crystal of calcium sulphate was obtained.

With 2.4 grams $CeO_2$ small needle-like crystals mixed with small plate crystals were obtained.

With 1,2 grams $Ce_2O_3$ the effect was not as pronounced as with $CeO_2$ but with 4.3 grams $Ce_2O_3$ the calcium sulphate needle-like crystals obtained were comparable in size with those obtained with tetravalent cerium compounds.

In the case of thorium it was found that amounts as low as 0.12 grams $ThO_2$ per 1000 grams of 19% sulphuric acid had little effect upon the size of the calcium sulphate crystals formed.

At a concentration of 0.44 grams $ThO_2$ per 1000 grams of dilute sulphuric acid the calcium sulphate was obtained in exceedingly fine, needle-like crystals.

Amounts of 0.91, 1.80, 2.73, 3.64 grams $ThO_2$ and dilute sulphuric acid saturated with thorium sulphate showed very little further decrease in size of the calcium sulphate crystals over that obtained with 0.44 grams, but as the thorium content increased there was evidence that the product contained broad, plate-like crystals in addition to fine acicular crystals.

We also contemplate the use of our novel restraining agents in the precipitation of calcium salt such lithopone from for instance, a calcium salt such as calcium hydrosulphid or a mixture of calcium chloride and sodium sulphid with zinc sulphate.

The figures for the restraining agent are given in the above examples in most instances as the oxide of the effective element. It was experimentally found that the acid radical combined with the oxide is entirely immaterial.

The restraining agent can be added to the solution containing the calcium ion as well as the solution containing the sulphate ion, the results are in both cases substantially the same.

We claim:

1. The process of forming calcium sulphate in an aqueous medium in the presence of a compound which in aqueous solution forms a positive ion of an element which has an ionic radius not less than 1.0 but less than 1.2 Angstrom units and a valency greater than 2.

2. In a process of making calcium sulphate the steps of forming said calcium sulphate in an aqueous medium containing a restraining agent which in aqueous solution forms a positive ion of an element which has an ionic radius not less than 1.0 but less than 1.2 Angstrom units and a valency greater than 2, whereby a calcium sulphate is obtained of a crystal size smaller than would be obtained in the absence of said restraining agent.

3. The process of forming calcium sulphate in an aqueous medium by reacting a calcium compound with a sulphate radical containing compound in the presence of a compound which in aqueous solution forms a positive ion of an element which has an ionic radius not less than 1.0 but less than 1.2 Angstrom units and a valency greater than 2.

4. In a process of making calcium sulphate the step of reacting an aqueous solution containing calcium ions with an aqueous solution containing sulphate ions in the presence of a compound which in aqueous solution forms a positive ion of an element which has an ionic radius not less than 1.0 but less than 1.2 Angstrom units and a valency greater than 2.

5. In a process of making calcium sulphate the step of reacting sulphuric acid in aqueous medium with a decomposable calcium compound in the presence of a compound which in aqueous solution forms a positive ion of an element which has an ionic radius not less than 1.0 but less than 1.2 Angstrom units and a valency greater than 2.

6. In a process of making calcium sulphate the step of reacting sulphuric acid in aqueous medium with a calcium compound selected from the group consisting of $CaO$, $Ca(OH)_2$, $CaCl_2$, and $CaCO_3$, in the presence of a compound which in aqueous solution forms a positive ion of an element which has an ionic radius not less than 1.0 but less than 1.2 Angstrom units and a valency greater than 2.

7. In a process of making calcium sulphate the steps of forming said calcium sulphate by reacting with sulphuric acid upon a calcium compound selected from the group consisting of $CaO$, $Ca(OH)_2$, $CaCl_2$, and $CaCO_3$, in the presence of a restraining agent which in aqueous solution forms a positive ion of an element which has an ionic radius not less than 1.0 but less than 1.2 Angstrom units and a valency greater than 2, whereby a calcium sulphate is obtained of a crystal size smaller than would be obtained in the absence of said restraining agent.

8. The process of claim 1 in which the amount of restraining agent present is at least 0.1 mol per cent of the effective element, based on the calcium sulphate formed.

9. The process of forming calcium sulphate in an aqueous medium in the presence of a water soluble compound of an element chosen from the group consisting of cerium, thorium, tri-valent thallium and uranium.

10. The process of forming calcium sulphate in an aqueous medium in the presence of a water soluble compound of tetravalent cerium.

11. The process of forming calcium sulphate in an aqueous medium in the presence of a water soluble compound of thorium.

12. The process of forming calcium sulphate in an aqueous medium in the presence of a water soluble compound of uranium.

13. Finely divided calcium sulphate containing small amount of a compound of a metal which has an ionic radius not less than 1.0 but less than 1.2 Angstrom units, and a valency greater than 2.

14. Finely divided calcium sulphate containing a small amount of a cerium compound.

15. Finely divided calcium sulphate containing a small amount of a tetravalent cerium compound.

16. Finely divided calcium sulphate containing a small amount of a thorium compound.

WINFIELD W. HECKERT.
GORDON D. PATTERSON.